R. B. THOMPSON.
SEWING AND EDGING MACHINE.
APPLICATION FILED FEB. 18, 1914.
1,266,884.
Patented May 21, 1918.
9 SHEETS—SHEET 9.
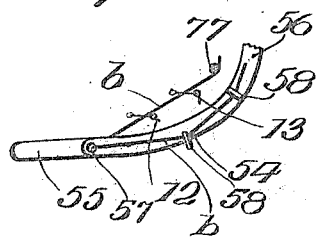
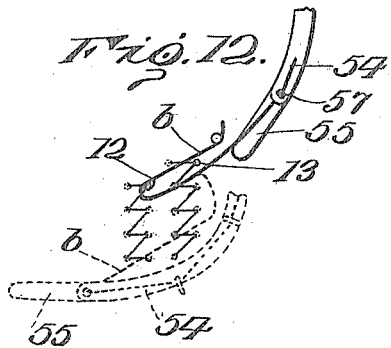
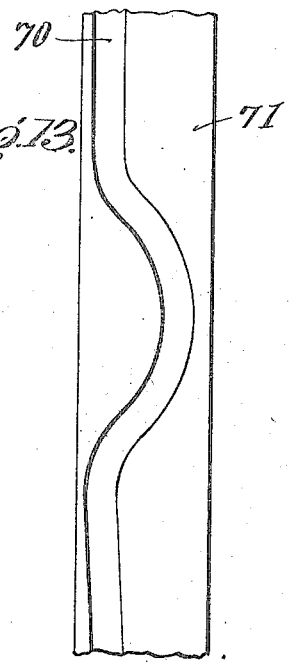
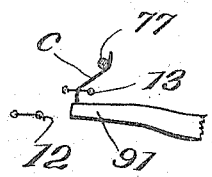
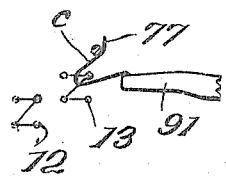
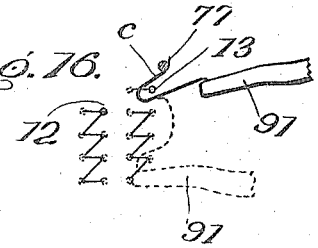
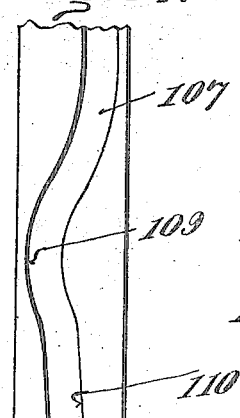
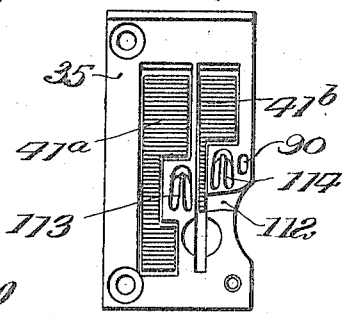
Witnesses
Inventor
Reuben B. Thompson
By
Attorneys

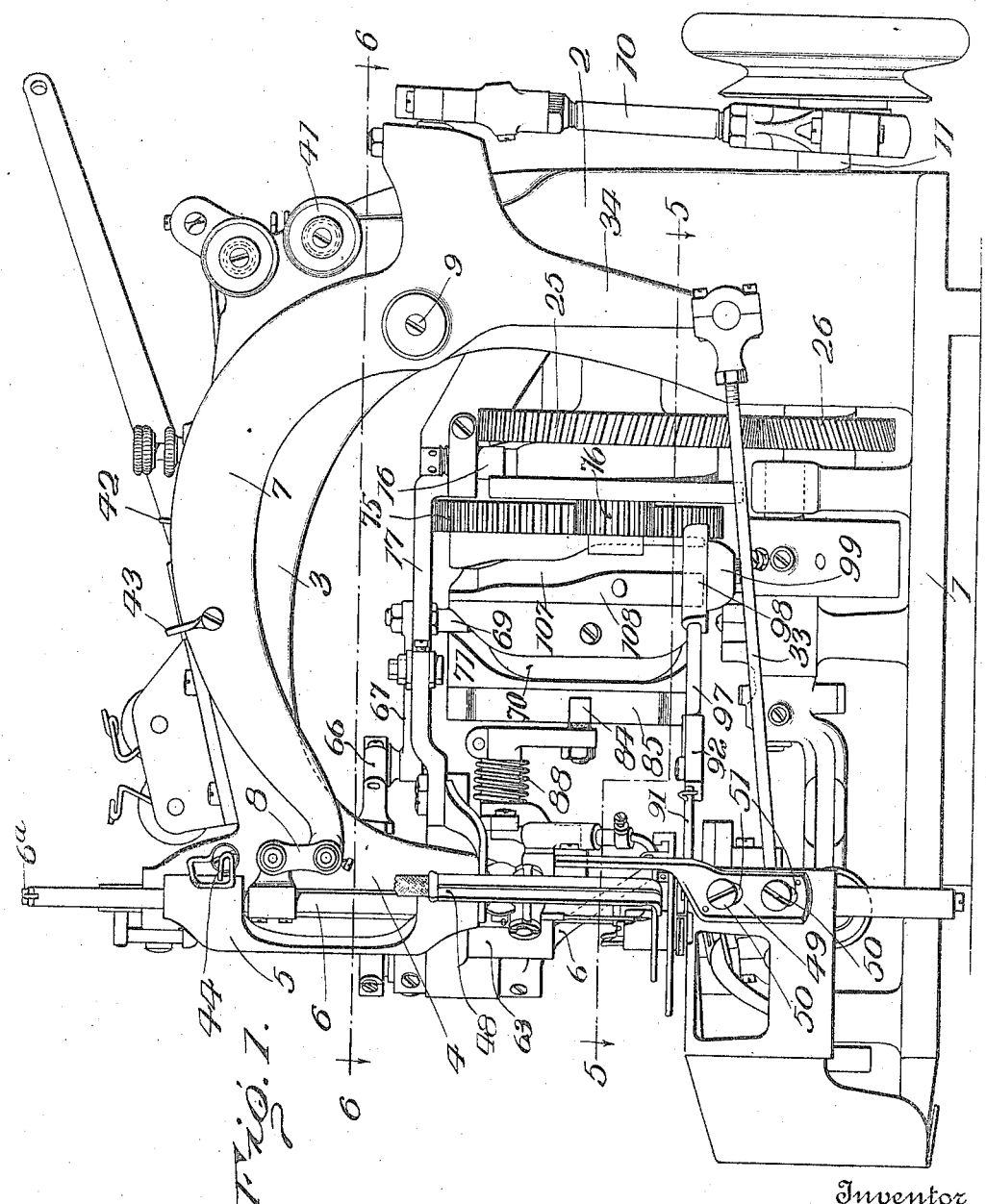

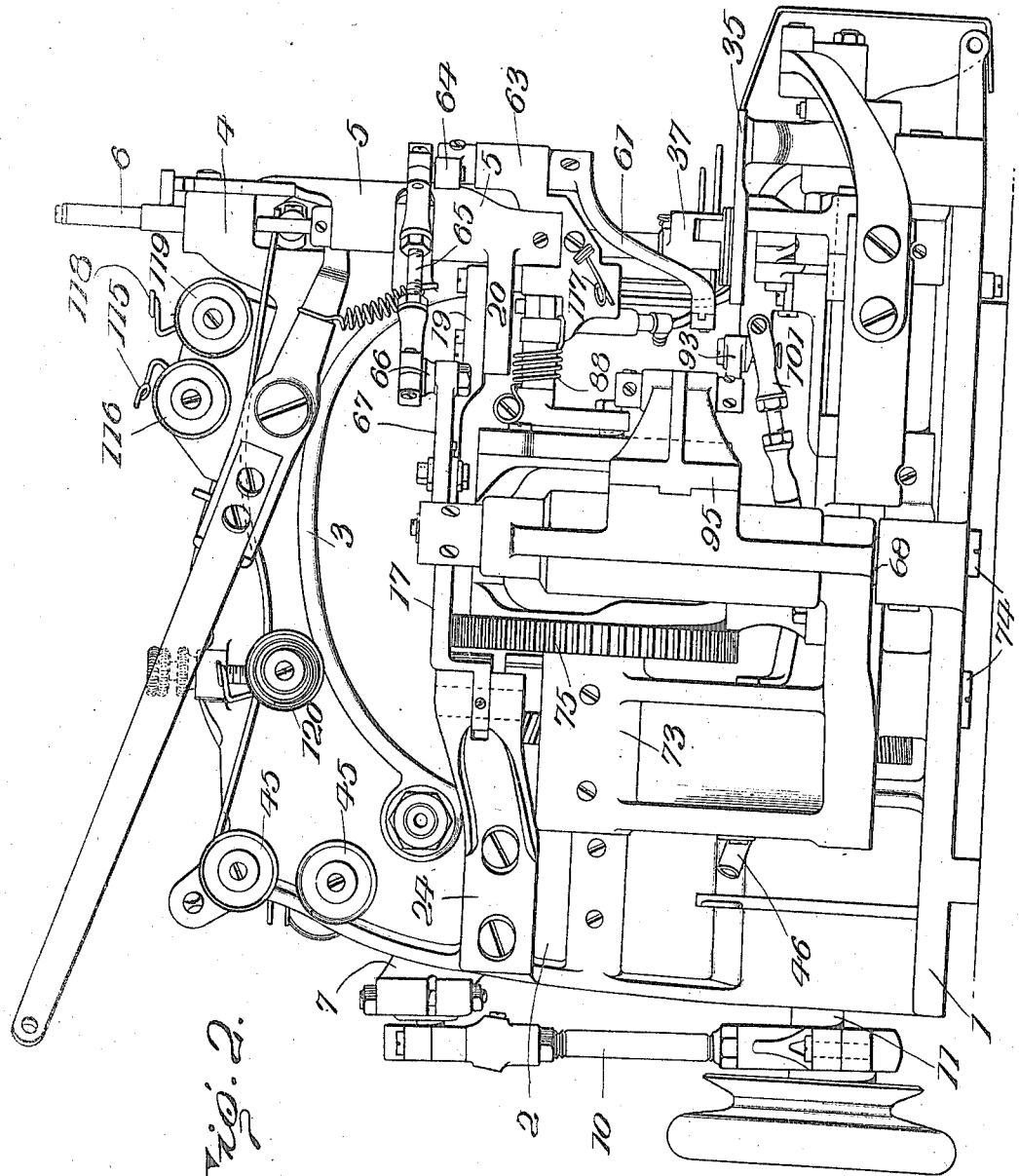

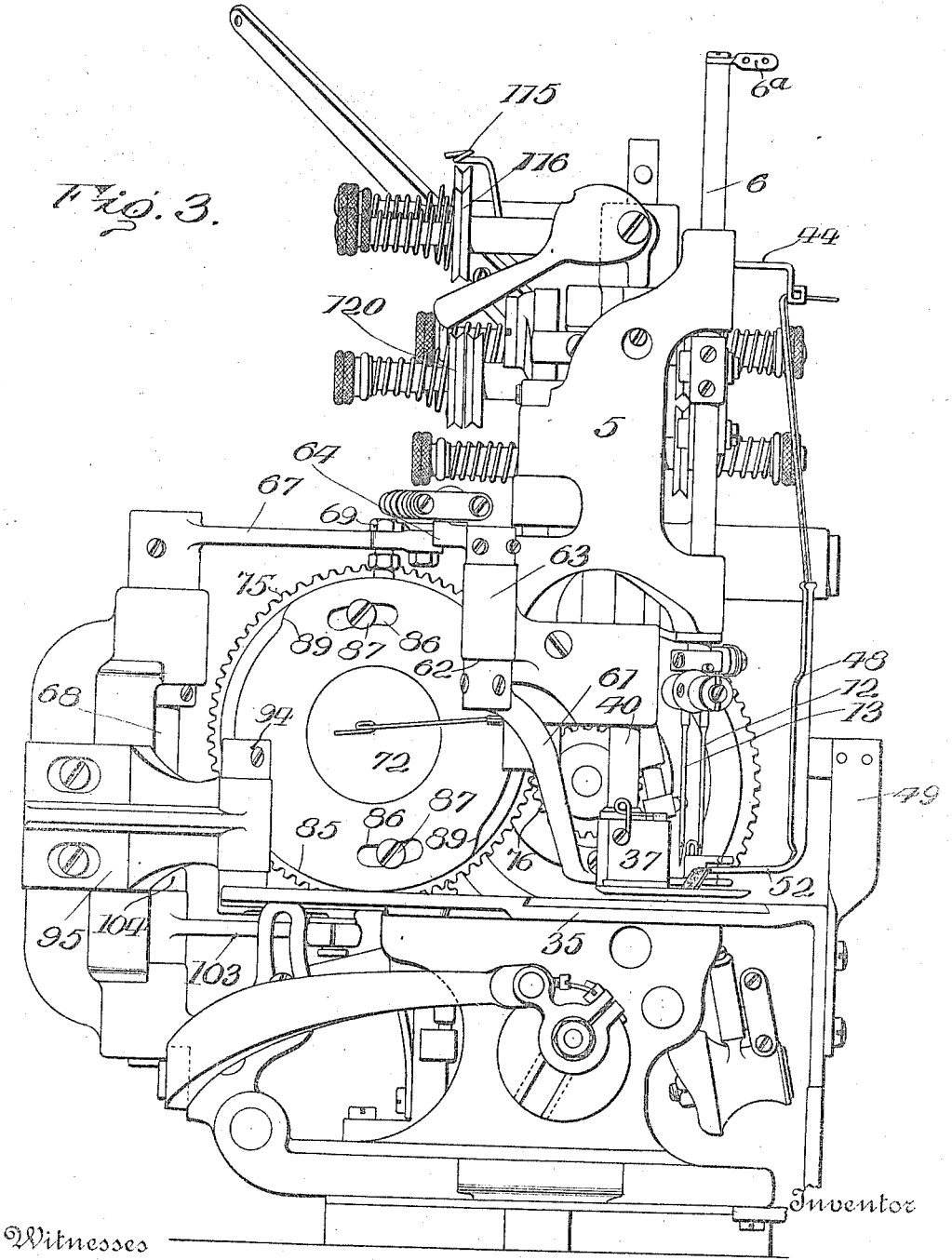

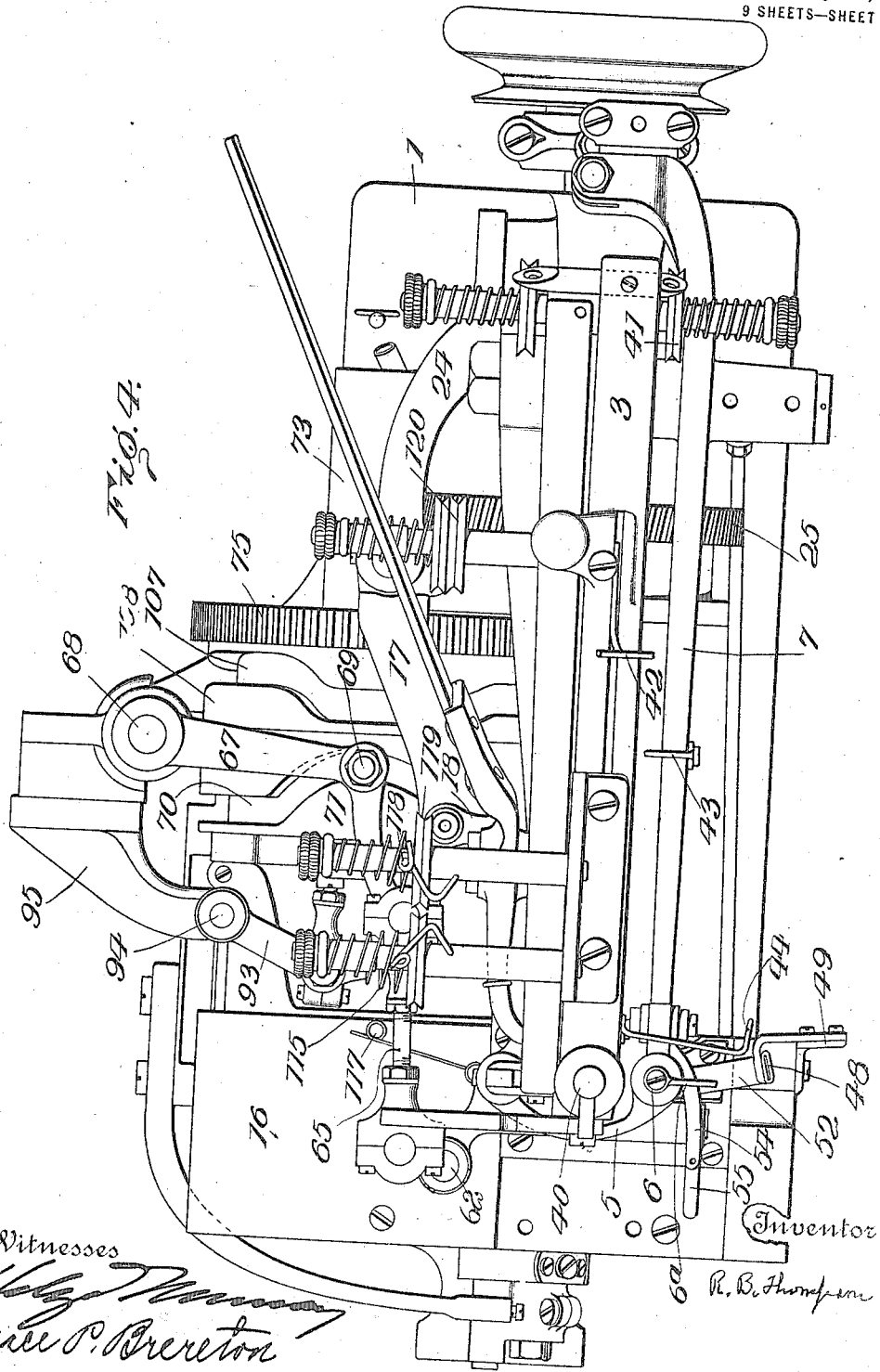

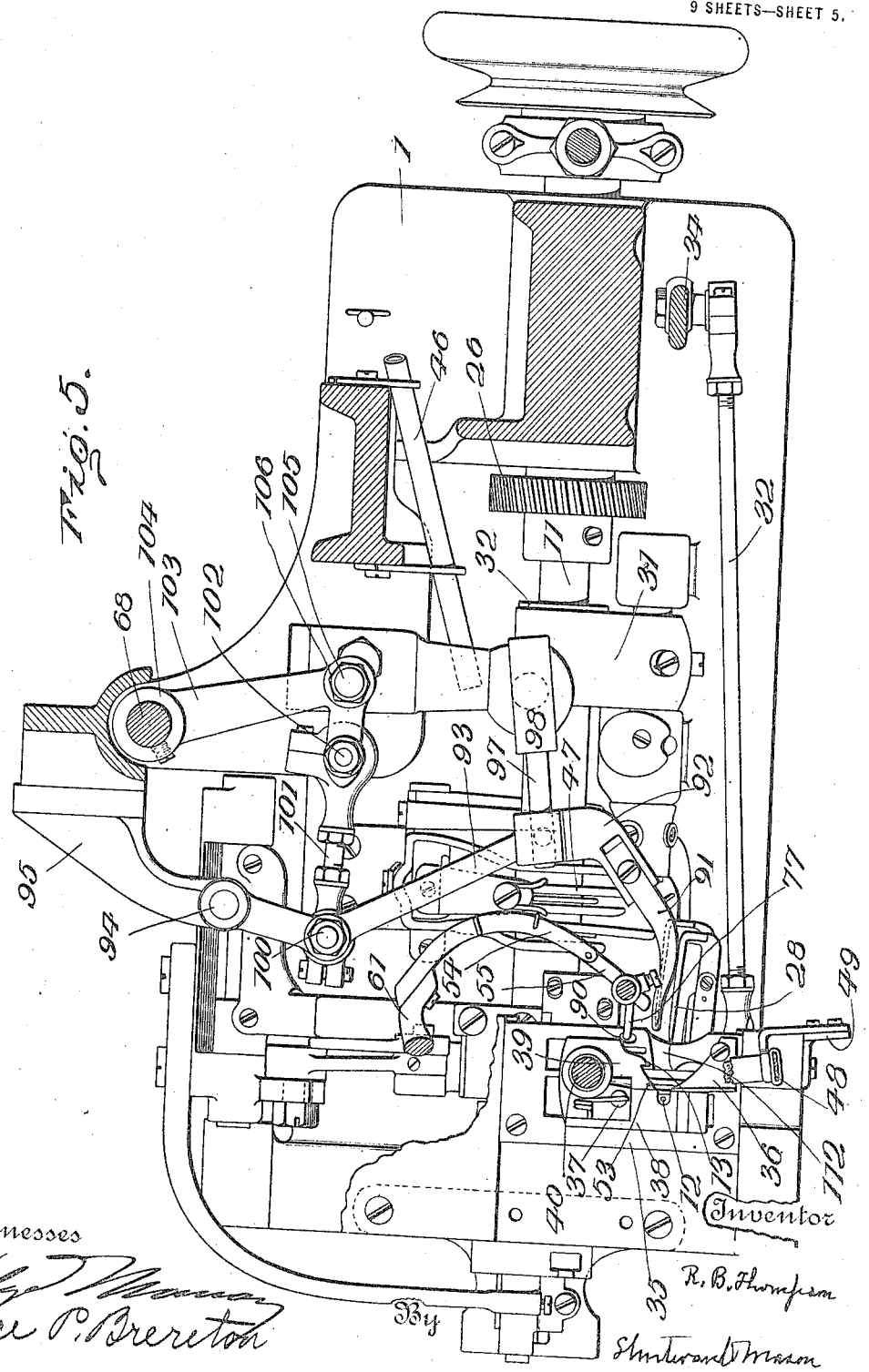

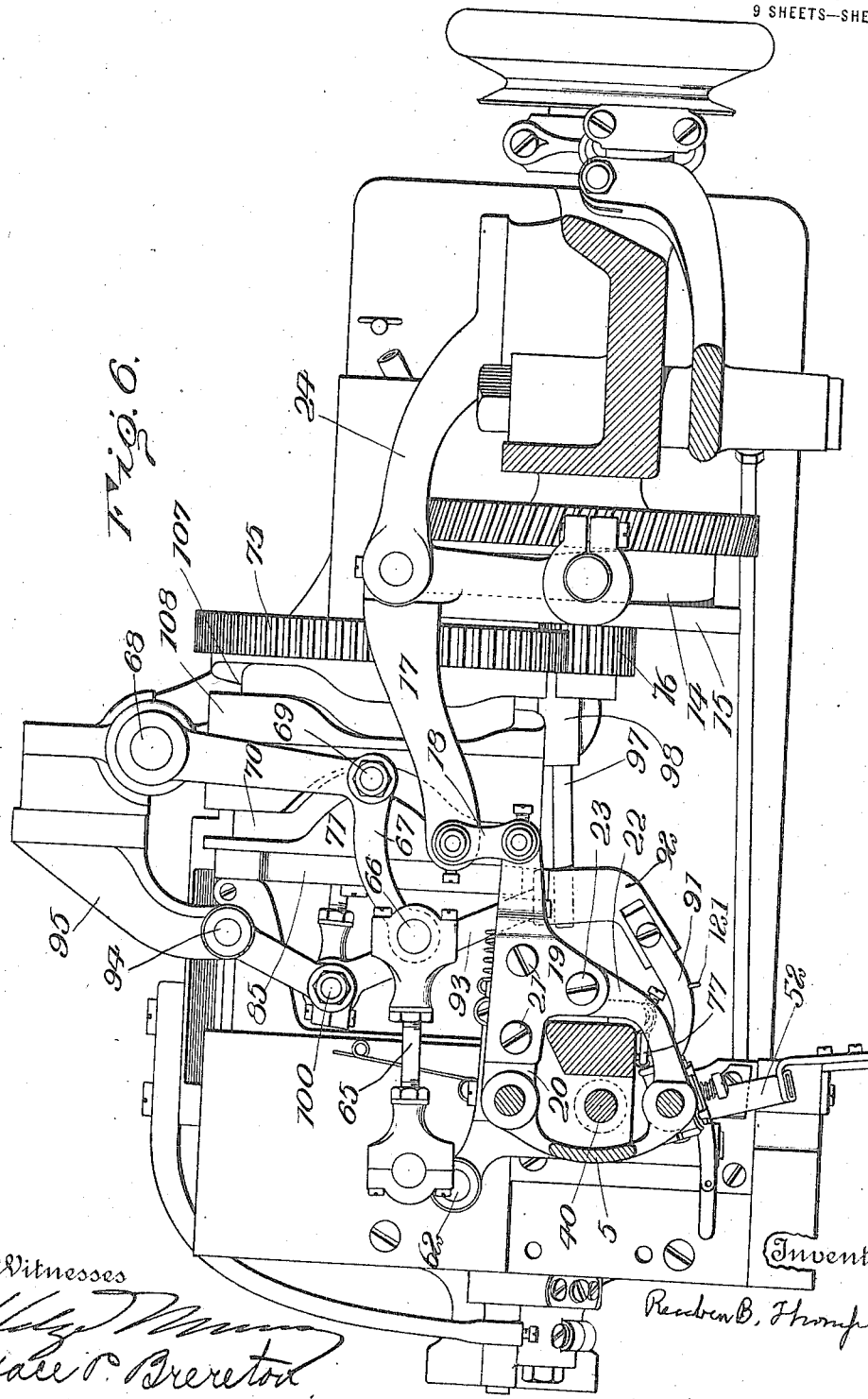

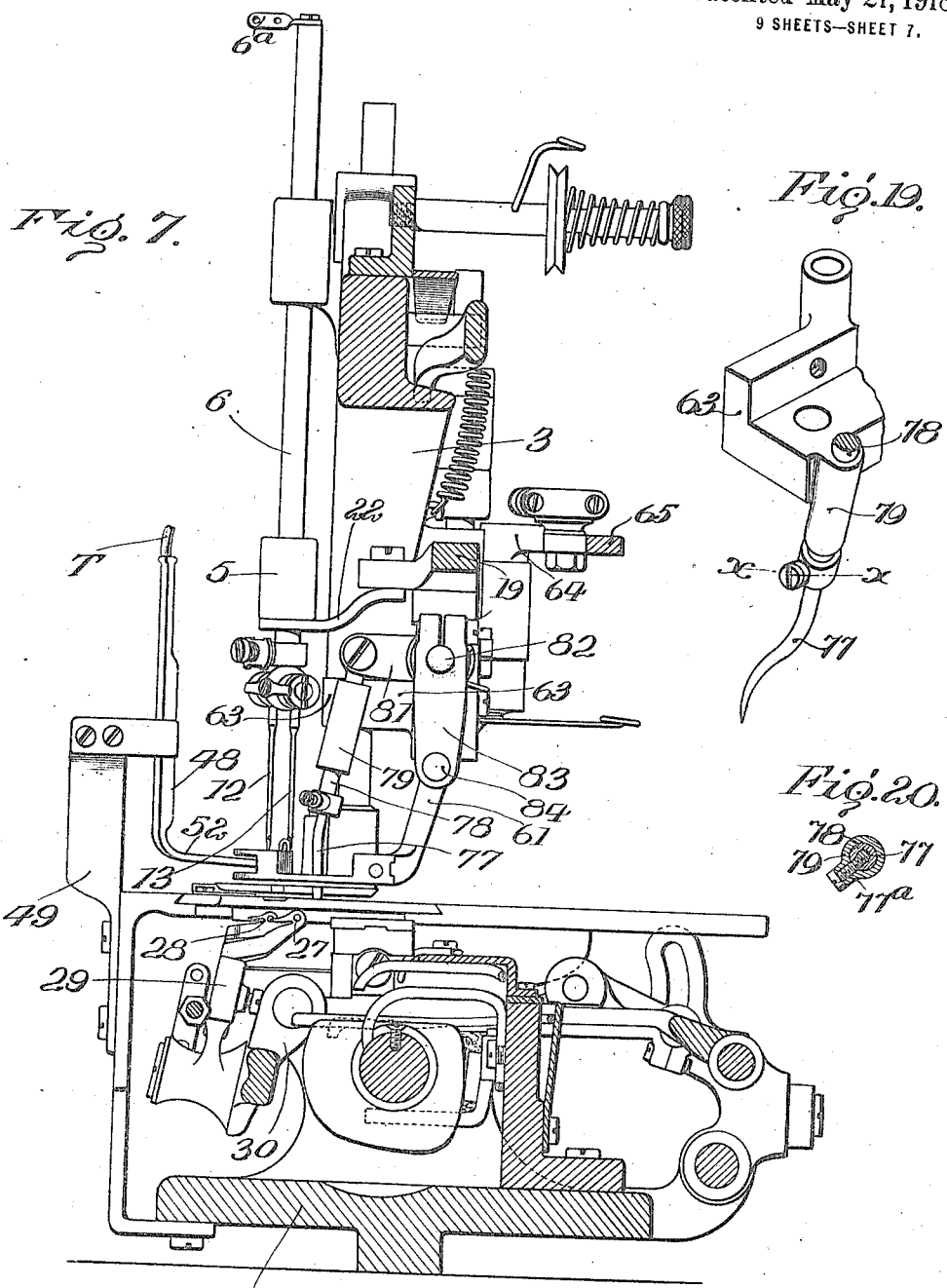

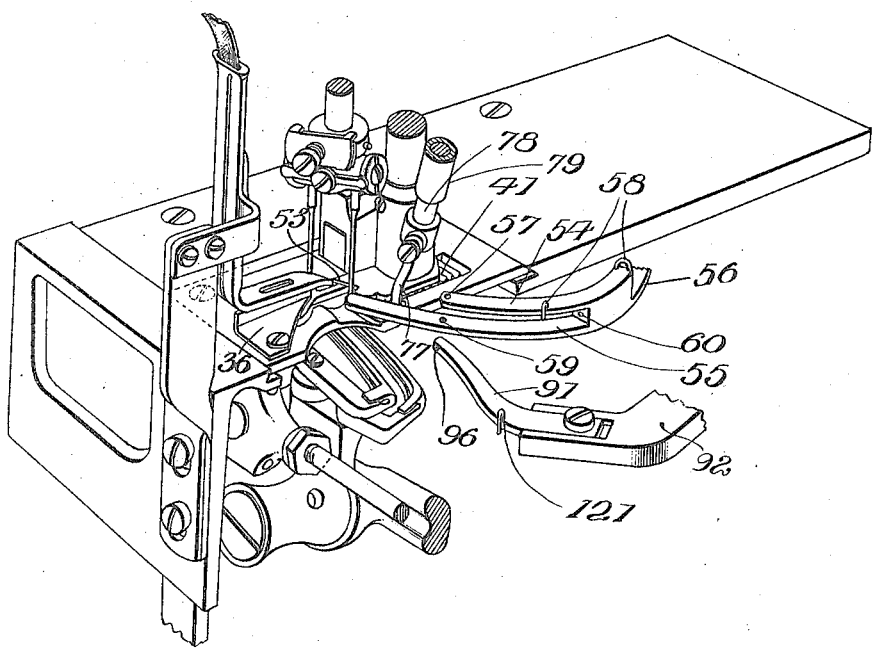
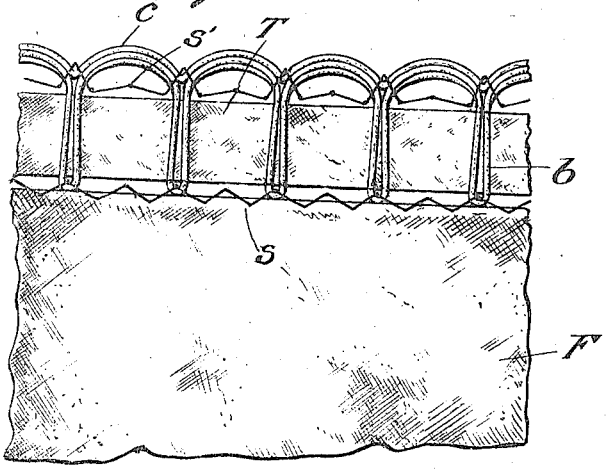
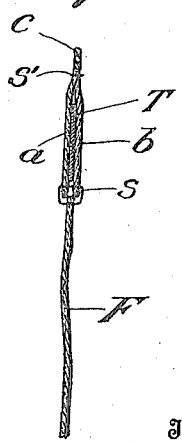

UNITED STATES PATENT OFFICE.

REUBEN B. THOMPSON, OF COHOES, NEW YORK, ASSIGNOR TO UNION SPECIAL MACHINE COMPANY, OF CHICAGO, ILLINOIS, A CORPORATION OF ILLINOIS.

SEWING AND EDGING MACHINE.

1,266,884.

Specification of Letters Patent. Patented May 21, 1918.

Application filed February 18, 1914. Serial No. 819,409.

*To all whom it may concern:*

Be it known that I, REUBEN B. THOMPSON, a citizen of the United States, residing at Cohoes, in the county of Albany, State of New York, have invented certain new and useful Improvements in Sewing and Edging Machines, of which the following is a description, reference being had to the accompanying drawing, and to the figures of reference marked thereon.

The invention relates to new and useful improvements in sewing machines, and more particularly to sewing machines which are adapted to form and stitch a projecting edge to the edge of a fabric.

An object of the invention is to provide a machine of the above character wherein devices are positively moved back and forth above and below a tape respectively for forming an edging, and the edging threads are secured to a fabric and to each other by lines of stitching which are laid at opposite sides of the tape but are free from engagement with the tape, and wherein a thread holding device is formed for said edging threads to properly position the same relative to the needles.

A further object of the invention is to provide a device of the above character with a device for laying a reinforcing scallop thread which is secured to the edging by the outer line of stitching.

A still further object of the invention is to provide devices of the above character wherein the needles are vibrated laterally during the stitching operation so that the edging may be secured to a fabric by the over edge stitches only whereby the edging will lie in the plane of the fabric.

A still further object of the invention is to provide a thread laying device for forming a reinforced scallop, which thread laying device has a movement given thereto for drawing a length of thread through the eye of said device.

These and other objects will in part be obvious and will in part be hereinafter more fully disclosed.

In the drawings which show by way of illustration one embodiment of the invention, Figure 1 is a front view of an edging machine embodying my improvements.

Fig. 2 is a rear view of the same.

Fig. 3 is an end view of the machine.

Fig. 4 is a top plan view of the machine.

Fig. 5 is a sectional view on the line 5—5 of Fig. 1.

Fig. 6 is a sectional view on the line 6—6 of Fig. 1.

Fig. 7 is a vertical sectional view in rear of the needle head looking in the direction thereof.

Fig. 8 is a detail in perspective showing the stitching elements and the thread laying devices for forming the edging.

Fig. 9 is a plan view on an enlarged scale showing a fabric having an edge built thereon by my improved mechanism.

Fig. 10 is a sectional view through the same.

Fig. 11 is a detail showing diagrammatically the position of the needles and the edging forming fingers at the forward end of their stroke.

Fig. 12 is a similar view showing said fingers at the rear end of their stroke and in dotted lines the fingers at the forward end of their stroke, and the stitches which are made between these movements of the fingers.

Fig. 13 is a detail showing a development of a section of the cam for operating the edging forming fingers.

Fig. 14 is a detail showing diagrammatically the position of the needles and the scallop-forming finger when said finger is at the forward end of its stroke.

Fig. 15 is a similar view with said finger at its intermediate position of dwell.

Fig. 16 is a similar view showing the finger at the rear end of its stroke and in dotted lines the finger moving to the forward end of its stroke.

Fig. 17 is a plan view showing the development of a portion of the cam for operating the scallop-forming finger.

Fig. 18 is a plan view of the throat plate, also showing the feed dogs.

Fig. 19 is a detail in perspective, showing the supporting bracket at the lower end of the needle head, and the thread-holding finger with a portion of its supporting rod.

Fig. 20 is a section on the line x—x of Fig. 19.

The invention consists, generally, in providing a stitch forming mechanism which includes two needles which are laterally spaced so that a tape may be fed between the needles. These needles are vibrated laterally at alternate stitches but in neither position do they engage the tape. Coöperating with the stitch forming needles and the tape feeding device are edging forming fingers which are vertically spaced and which are oscillated one above and the other below the tape as it is fed underneath the presser foot. These fingers each carry an edging forming thread. The fabric on to which the edging is to be built is fed along side of one of the stitching needles in such a position that the needle at one stroke will enter the fabric while at its next stroke it will pass over the edge of the fabric. These thread laying fingers which build the edging are so timed and oscillated as to lay their threads in a loop which is entered by this needle which passes through the fabric at the stitch when said needle passes over the edge of the fabric so that the edging threads will be joined to the body fabric by the over edge stitch and these edging forming threads will, therefore, lie substantially in the plane of the fabric. The other needle forms stitches in the air, so to speak, which produce an enchained line of stitches lying along but outside of the other edge of the tape. A third thread carrying finger is so positioned and timed as to lay a reinforcing scallop thread in loops which are entered by the needle forming the stitches in the air at every fourth stroke of the needle. Thus an edging is built up wherein the edging threads extend above and below the tape and are abutted against the edge of the body fabric and are secured thereto. A scallop thread is also laid along the outer edge of the edging and is secured to the edging by the chain of stitches which unite the edging threads and hold the same in proper spaced relation to each other.

Referring more in detail to the drawings, in the present embodiment of the invention, my improved sewing and edging machine consists of a bed plate 1 from which rises a standard 2 having an overhanging arm 3 carrying a needle head 4 on which is mounted a needle gate 5. A needle bar 6 is reciprocated in said head by a needle lever 7 which is connected to the needle bar by a link 8. This needle lever is pivoted at 9 to the overhanging arm and is oscillated by a link 10 which coöperates with an eccentric on the main shaft 11. The needle bar 6 as herein-shown carries two needles 12 and 13, which are spaced from each other and which are also set in a line slightly inclined to the line of feed, see Figs. 5 and 8. The needle gate 5 is oscillated back and forth for vibrating the needles laterally by a cam 14 formed in a drum 15 pivoted on a stub shaft carried by the standard. This cam 14 engages a roller 16 on a rock lever 17. The rock lever 17 is connected by a link 18 to a bracket 19 which is secured to an arm 20 formed integral with the needle gate 5 by screws 21. A second arm 22 is also fixed to the needle gate at the end thereof in which the needle bar reciprocates and this arm 22 is secured to the bracket 19 by a screw 23. This connection between the rock lever 17 and the needle gate forms a very rigid connection for imparting lateral vibrations to the needle bar. The rock lever 17 is pivoted to a bracket arm 24 screwed to the standard. The drum 15 carries a gear wheel 25 which meshes with a gear wheel 26 on the main shaft 11. These gear wheels are so proportioned that the drum 15 rotates once for every two complete rotations of the main shaft so that for each complete reciprocation of the needle bar said needle bar is moved laterally once.

Coöperating with the needles underneath the work support are the loopers 27 and 28. These loopers are fixed to a looper carrier 29 which is pivoted on a looper support 30. The looper support is oscillated by an arm 31 which coöperates with an eccentric 32 on the main shaft 11. This oscillation of the looper support gives the usual needle avoiding movement to the loopers.

The looper carrier is oscillated on its support by a link 33 which is pivoted to the needle lever extension 34.

The body material on to which an edging is to be built is guided over the work support 35 by an edge guide 36. This edge guide 36 is so disposed that the edge of the body material is fed between the extremes of vibration to the left hand needle 12 so that said needle will enter the body fabric at one stitch and at the next stitch will pass over the edge of said fabric.

The fabric being stitched is held on the work support 35 by a presser foot 37. This presser foot is formed with a yielding section 38 which engages the body fabric and with a rigid section 39 located at one side of said yielding section. This yielding section is of the usual construction and a detail construction thereof is not thought necessary. The presser foot is carried by the presser bar 40 and is mounted so as to be moved up and down in the needle head at the forward end of the overhanging arm. Coöperating with the presser foot is a feed dog 41, which is of the usual four motion type, wherein said feed dog is moved into engagement with the fabric and then horizontally for feeding the fabric after which it is lowered from engagement with the fabric and returned for its next feeding stroke. The needle threads are led through tension devices 41 and thence through suitable guides 42 and 43 to a guide 6ª at the upper end of the needle bar and from thence through other guides to the needles. The looper threads are led through suitable tensions 45 and thence through the guiding tube 46 to the usual looper thread controlling mechanism 47 and from thence to the loopers.

A tape is fed through a guide 44 and is then directed underneath the presser foot and between the needles by a tape guide 48. This tape guide is mounted on a bracket 49 adjustably secured to the work support by screws 50 which pass through vertical slots 51 in the bracket into the work support. Said tape guide is tubular in form and extends from the point above the lower end of the needle gate to a point adjacent the stitching mechanism. At the lower end the tape guide is bent so as to extend horizontally, as at 52. The forward end of this tape guide lies adjacent the path of movement of the needles, and the delivery end thereof is inclined so as to extend in a direction substantially parallel with a line containing the needles. This tape guide is also directly in front of the rigid section of the presser foot and said section at its forward end is formed with a guiding recess 53 which extends underneath the presser foot and the full length thereof. Said guiding recess is also cut so as to be inclined to the line of feed and extends in a direction parallel with a line passing through the needles.

The edging is built on to the body fabric by thread laying fingers 54 and 55, see Fig. 8. These thread laying fingers are formed integral with a supporting shank 56 and are vertically spaced, as clearly shown in this figure of the drawing. The upper thread finger 54 is provided with a guide eye 57 and with guiding devices 58 through which the thread is led to said guide eye. The lower thread finger 55 extends some distance in advance of the upper thread finger and is provided with a thread guiding eye 59 located substantially in line with the thread guiding eye 57 in the finger 54.

The shank 56 is formed with a passage 60 through which the thread is led to the thread guiding eye 59. The shank 56 is rigidly attached to an arm 61 carried by a rock shaft 62 mounted to oscillate about a vertical axis in a bracket 63 secured to the lower end of the needle head. The upper end of the rock shaft 62 carries an arm 64 which has a ball stud and this ball stud is pivotally connected to a link 65. The link 65 at its other end is pivoted to a ball stud 66 carried by an L-shaped arm 67, pivoted at 68 to a bracket carried by the bed of the machine. This L-shaped arm carries a roller stud 69 which runs in a cam groove 70 in a cam drum 71. This drum 71 is fixed to a sleeve mounted to rotate on a bearing 72 which is rigidly carried by a bracket 73, see Fig. 2. This bracket 73 is fixed to the bed plate of the machine by clamping bolts 74. The bracket supporting the drum is formed integral with the bracket supporting the pivot stud 68 for the L-shaped arm 67. The pivotal support 63 for the thread fingers 54 and 55 is located so that a line passing through the needles would be substantially tangential to a circle struck from its pivotal center. The thread fingers 54 and 55 are also curved substantially about the pivotal point 64 as a center so that these thread fingers may be caused to oscillate very close to the needles.

The cam groove 70, as clearly shown in Figs. 6 and 13, is so constructed that the thread fingers 54 and 55 are given an extended dwell when at the rear end of their stroke, and these fingers are rapidly moved forward and given a dwell at the forward end of their stroke only sufficient for the needles to pass down between the threads carried by the fingers and the body of the thread-carrying fingers themselves.

The cam drum 71 is rotated by a gear wheel 75 which meshes with a gear wheel 76 carried by the stud shaft which supports the drum 15. These gears 75 and 76 are so proportioned that the cam drum 71 rotates once for every four rotations of the cam drum 15. The cam groove 70 is formed with two lateral extensions, so that for every revolution of the cam drum 71, the thread fingers 54 and 55 will be given two complete oscillations. Therefore, the thread fingers 54 and 55 will be oscillated once for every fourth reciprocation of the needle bar, and said cams are so timed that the thread fingers are oscillated to form a loop in the edging threads, so that said loops will be engaged by the needle which passes through the fabric at the time said needle is passing over the edge of the fabric.

These thread fingers 54 and 55 are so positioned relative to the tape guide that one finger moves above the tape guide, while the other finger moves below the tape guide.

Coöperating with these thread-laying fingers which form the edging, is a thread-holding finger 77. This thread-holding finger 77 is fixed to a rod 78 which reciprocates in a sleeve 79 carried by the bracket 63, above referred to. Said finger is held in a recess in the rod 78 by a set screw 77ª, which permits said finger to be adjusted longitudinally of the rod and also turned in its recess or socket. The upper end of the rod 78 is pivoted to an arm 81 of a rock lever pivoted at 82 to the bracket 63. This rock lever has a depending arm which carries a roller stud 84 adapted to engage a surface cam 85 attached to and rotating with the cam drum 71. This surface cam is provided with slots 86 and screws 87 passing through the slots hold the surface cam to the drum. The slots are so shaped that the cam may be angularly adjusted relative to the drum. A spring 88 surrounding the rock shaft carrying the arm 83 yieldingly holds the roller stud 84 in contact with the cam 85. This cam 85 is provided with two operating shoulders 89, each of which separates two extended dwell portions on the cam. The thread holding fingers 77 will be raised and lowered as this cam 85 rotates. When the finger is in its lower position, it enters a recess 90 in the work support 35. This finger when in its extreme lower position serves as a post around which the edging threads are laid so that they are drawn taut and properly positioned for the needles to pass between the threads and the body of the fingers 54 and 55. This finger 77 is raised after the edge forming threads are secured by the needle threads so as to permit the formed edging to be fed forward with the body fabric.

A reinforcing scallop thread is carried by a thread finger 91. This thread finger is attached to a supporting shank 92. The supporting shank 92 is pivoted on a rock arm 93 which in turn is pivoted at 94 to a bracket arm 95 adjustably attached to the main supporting bracket which carries the cam drum and the pivotal support for the arm 67. The thread finger 91 is formed at its front end with a thread guiding eye 96. The supporting shank for this thread finger rigidly carries an arm 97 which slides in a sleeve 98 pivotally mounted on a bracket arm 99 which is formed as a part of the main bracket, above referred to. The arm 93 carries a ball stud at 100 which is connected to a link 101. The other end of the link 101 is connected to a ball stud 102 carried by an L-shaped lever 103.

This L-shaped lever 103 is loosely mounted on the pivotal support 68 for the arm 67. A collar 104 holds the arm 103 in place. The L-shaped arm 103 carries a supporting stud 105 on which is mounted a roller 106. This roller 106 runs in a cam groove 107 formed in a cam drum 108 located along side of and rotating with the cam drum 71. This roller stud engages the cam drum 108 at the lower side thereof, while the roller stud 69 engages the cam drum 71 at the upper side thereof. The cam groove 107, see Fig. 17, is formed with a cam section 109, a substantially straight section 110, which is relatively short, and a longer straight section 111. This cam groove is so proportioned and shaped that the thread finger for laying the reinforced scallop of thread is moved to the forward end of its stroke where it is held for an instant by the cam section 109. When at the forward end of its stroke the thread carried thereby is laid around the thread finger 77 and the thread between the eye in the thread carrying finger 91 and the thread holding finger 77 is taut and is so positioned relative to the right hand needle at its extreme right hand stroke that said needle passes between the thread and the body of the thread carrying finger 91. This thread finger 91 is then retracted to an intermediate position where it is given a dwell by the straight section 110 in the cam groove 107. Said thread carrying finger 91 is then given a further backward movement and a final dwell by the straight section 111 in said cam groove 107. This second movement of the thread finger pulls thread through the finger for giving the necessary slack to form the scallop.

The thread carrying finger 91 has a very irregular pull or movement, owing to the fact that it is pivoted to the oscillating arm 93 and its movements on said pivotal connection are controlled by the sleeve 98. The first movement of the thread carrying finger 91 is substantially a straight movement in a direction substantially at right angles to the line of feed. The second movement of the thread carrying finger is in a direction away from the line of feed and rearward or toward the operating drum therefor. The work support is formed with a recess 112, and the thread carrying finger 91 moves into and out of this recess. The thread carrying finger, therefore, at its forward end, moves underneath the tape.

The feed dog 41 is made in two sections, 41$^a$ and 41$^b$, see Fig. 18. A stitch finger 113 is provided for the needle 12, and a stitch finger 114 is provided for the needle 13. A feed dog 41$^b$ has a section extending to a point slightly in advance of the needle 13 so that the tape and the built up edging will be properly fed along with the fabric which is fed by the feed section 41$^a$.

In Fig. 9 of the drawings, I have shown a body fabric F, on to which an edging has been built, which consists of edge forming threads $a$ and $b$. These threads are formed in loops, one above and the other below a tape T. The loops are joined to the body fabric by a line of stitching $s$, which is a zig-zag line of stitching, certain alternate stitches of which extend over the edge of the body fabric and through the loops in the edging threads. These edging threads are also joined and held in predetermined position relative to each other by a line of stitching $s'$, or a line of enchained loops. These enchained loops are also formed by a needle which vibrates laterally. A reinforced edging thread $c$ is laid in scallops and is secured to the line of stitching $s'$ by every fourth stitch therein.

The thread $a$ passes through a suitable guide 115 and thence between tensions 116 and through a slack controlling wire loop 117. The edging thread $b$ passes through a guide eye 118, thence through tensions 119, and thence through said slack controlling loop 117. The scallop thread $c$ is led through a suitable tension 120 and thence to the guide eye 121 carried by the thread carrying fingers 91.

In Figs. 11 and 12 of the drawings, I have shown more or less diagrammatically the thread carrying fingers 54 and 55 at the forward end of their stroke, and the threads *a* and *b* drawn taut around the post formed by the thread finger 77, and the needles 12 and 13 pass between the threads *a* and *b* and the body of the thread fingers 54 and 55, and the thread between the eye of the needles and the previous needle punctures is laid across these threads *a* and *b*. The needle threads at this stroke join the loops formed in the edging threads to the body fabric and also unite the two threads, one of which extends above the tape, and the other below the tape at a point outside of the tape.

In Fig. 12, I have shown the thread fingers 54 and 55 retracted, and in dotted lines, the next forward movement of the thread fingers, and the intermediate stitches formed by the needle threads, and it will be noted that the edge forming threads are secured to the body fabric at every fourth stitch, and likewise the two threads forming the edging are bound together at every fourth stitch.

In Fig. 14 of the drawings, I have shown the thread carrying finger 91 in its forward position and the thread *c* carried thereby as extending about the post formed by the thread finger 77. The thread *c* is secured by the needle thread extending between the eye of the needle 13 and the previous interlocking of the threads formed by the previous passing of the needle, as indicated in dotted lines in this figure.

In Fig. 15, the next advance downward movements of the needles is indicated and the thread finger 91 is retracted to its intermediate position.

In Fig. 16, the thread finger 91 is shown in its extreme rearward position having drawn off thread for the next scallop, and in dotted lines its forward position wherein the scallop is laid and the scallop thread again secured by the outer needle. The timing of the thread finger 91 and the thread fingers 54 and 55 are such that the scallop thread of the finger 91 is joined to the threads laid by the fingers 54 and 55. In other words, the outer needle 13 forms stitches which surround the threads *a* and *b* and the scallop thread.

In the operation of my machine, a body fabric on which an edging is to be fed is fed alongside of the edge guide; the thread fingers 54 and 55 lay edging threads in loops which are secured to this body fabric by the stitching threads of one of the needles. A tape is fed between the edging threads and these edging threads are secured together outside of the tape by the other stitching needle which also joins the scallop thread to the edging which reinforces the scallops.

These edging threads are joined together and held in predetermined position to each other by the interlocked loops of this outer needle, and the tape which extends between the loops of the edging threads is free to slide in said loops.

I have, by the mechanism above described, provided a machine for rapidly forming an edging which is of a durable character and the edge is not only formed around the tape but is so secured to the body fabric as to lie substantially in the plane of the body fabric. The stitching threads over-edge the body fabric and cover the same, and also join the bars or loops of the edging so as to hold them in predetermined relation to each other.

It is obvious that minor changes in the details of construction and the arrangement of parts may be made without departing from the spirit of the invention as set forth in the appended claims.

Having thus described my invention, what I claim is:

1. A sewing machine for forming an edging on a fabric comprising stitch forming mechanism including spaced needles, a thread guiding device movable in front of the needles for forming a loop in an edging thread to be entered by said needles, a thread finger located in the rear of said needles around which the edging thread is drawn, a second thread guiding device, and means for moving said last named thread guiding device for forming a loop in a scallop reinforcing thread and positioning the same for the entrance of one of said needles only.

2. A sewing machine for forming an edging on a fabric comprising stitch forming mechanism including spaced needles, a tape guide located in advance of the needles for guiding a tape between the needles, a fabric guide for guiding a body fabric to one of the needles only, thread guiding devices movable above and below the tape guide in front of the needles, a thread holding finger located in rear of the needles and coöperating with said thread guiding device for positioning the edging thread for the entrance of both needles into said loop, a second thread guiding device, and means for moving the same so as to position a loop of scallop reinforcing thread for the entrance of one of the needles only.

3. A sewing machine for forming an edging on a fabric comprising spaced needles, means for vibrating said needles laterally, means for feeding a fabric to one of said needles whereby stitches are formed around the edge of the fabric, a tape guide in front of said needles for guiding a tape between the needles, thread guiding devices movable above and below the tape guide respectively for forming loops in an edging thread and for presenting these loops to the over-edge stitches of the needles at certain intervals, and a stitch finger located in rear of the needles around which said edging threads are drawn, means independent of the thread guiding devices for raising the said stitch finger for permitting the free feed of the fabric and the formed edging.

4. A sewing machine for forming an edging on a fabric comprising spaced needles, means for vibrating said needles laterally, means for feeding a fabric to one of said needles whereby stitches are formed around the edge of the fabric, a tape guide in front of said needles for guiding a tape between the needles, thread guiding devices movable above and below the tape guide respectively for forming loops in an edging thread and for presenting these loops to the over-edge stitches of the needles at certain intervals, and a stitch finger located in rear of the needles around which said edging threads are drawn, means independent of the thread guiding devices for raising the said stitch finger for permitting the free feed of the fabric and the formed edging, a second thread guiding device for guiding a scallop thread and forming loops therein at intervals to be engaged by the needle which is located at a distance from the edge of the fabric.

5. A sewing machine for forming an edging on a fabric, comprising a work support, stitch forming mechanism including spaced needles, means for vibrating the needles laterally, said work support having a stitch finger over which the needle stitches are formed, a feed dog having a section located in rear of each needle, an edge guide for guiding a body fabric to one of said needles, whereby the edge of the fabric is overstitched, a presser foot having a yielding section adapted to bear on the body fabric, and a rigid section having a guiding recess located between the needles, means for guiding a tape between the needles to said guiding recess, thread guiding fingers operating above and below the tape guide, respectively, for forming loops in an edging thread and presenting the same to the needle engaging the body fabric when certain of the stitches are passing over the edge of the fabric.

6. A sewing machine for forming an edging on a fabric, comprising a work support, stitch forming mechanism including spaced needles, means for vibrating the needles laterally, said work support having a stitch finger over which the needle stitches are formed, a feed dog having a section located in rear of each needle, an edge guide for guiding a body fabric to one of said needles whereby the edge of the fabric is overstitched, a presser foot having a yielding section adapted to bear on the body fabric, and a rigid section having a guiding recess located between the needles, means for guiding a tape between the needles to said guiding recess, thread guiding fingers operating above and below the tape guide respectively for forming loops in an edging thread and presenting the same to the needle engaging the body fabric at certain of the stitches passing over the edge of the fabric, a thread finger located in rear of the needles around which the edging threads are drawn.

7. A sewing machine for forming an edging on a fabric, comprising a work support, stitch forming mechanism including spaced needles, means for vibrating the needles laterally, said work support having a stitch finger over which the needle stitches are formed, a feed dog having a section located in rear of each needle, an edge guide for guiding a body fabric to one of said needles, whereby the edge of the fabric is overstitched, a presser foot having a yielding section adapted to bear on the body fabric, and a rigid section having a guiding recess located between the needles, means for guiding a tape between the needles to said guiding recess, thread guiding fingers operating above and below the tape guide, respectively, for forming loops in an edging thread and presenting the same to the needle engaging the body fabric at certain of the stitches passing over the edge of the fabric, a thread finger located in rear of the needles around which the edging threads are drawn, and a third thread carrying finger adapted to present a reinforcing scallop thread to the needle at a distance from the edge of the fabric at certain intervals.

8. A sewing machine for forming an edging on a fabric, comprising spaced needles, means for feeding a fabric so that its edge is engaged by one of said needles, devices for forming loops in edging threads and presenting the same to said needles, a thread carrying device for forming reinforcing scallop loops and presenting the same to the needle at a distance from the edge of the fabric, means for operating said thread carrying device and give to said device a thread drawing movement for pulling slack to form the scallops.

9. A sewing machine for forming an edging on a fabric comprising spaced needles, means for feeding a fabric so that its edge is engaged by one of said needles, means for forming loops in edging threads and presenting the same to said needles, a thread carrying device for guiding and positioning a reinforcing scallop thread, means for bodily moving said thread carrying device toward and from the needles, and means for oscillating said thread carrying device to give a thread drawing movement thereto during its bodily travel.

10. A sewing machine for forming an edging on a fabric comprising spaced needles, means for feeding a fabric so that its edge is engaged by one of said needles, means for forming loops in edging threads and presenting the same to said needles, a thread carrying device for guiding and positioning a reinforcing scallop thread, an oscillating arm on which said thread carrying device is pivotally mounted, a bar rigidly carried by said thread carrying device and a pivoted sleeve in which said bar reciprocates.

11. A sewing machine including in combination stitch forming mechanism, a thread laying finger coöperating with said stitch forming mechanism, an oscillating arm on which said finger is pivotally supported, a bar rigidly attached to said finger, and a pivoted sleeve in which said bar reciprocates for oscillating said thread laying finger on said oscillating arm during the movements thereof.

In testimony whereof, I affix my signature in the presence of two witnesses.

REUBEN B. THOMPSON.

Witnesses:
R. J. DONLON,
FRANK T. MONAHAN.

Copies of this patent may be obtained for five cents each, by addressing the "Commissioner of Patents, Washington, D. C."